United States Patent Office 2,727,995
Patented Dec. 20, 1955

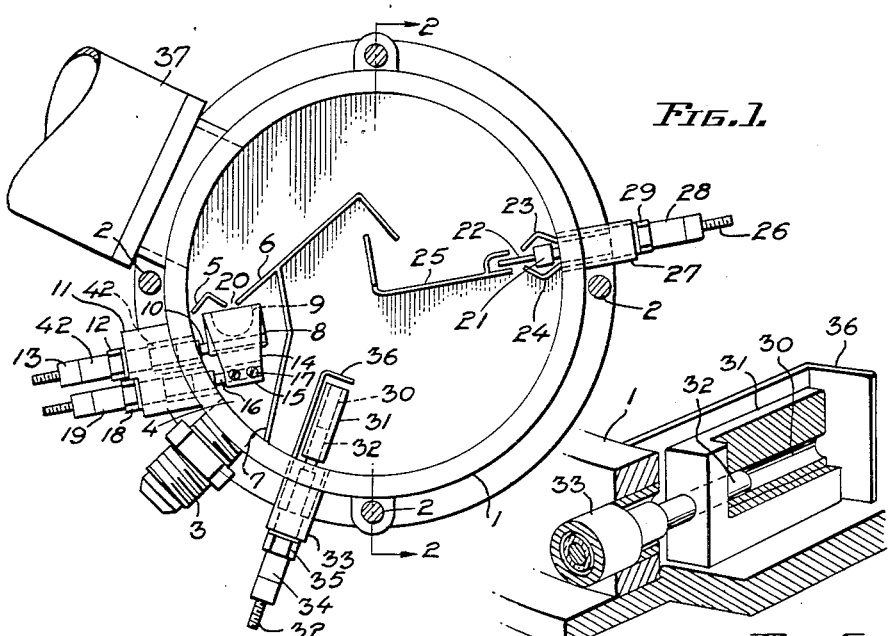

2,727,995

LEAK DETECTOR

Robert Loevinger, Berkeley, Calif., and Talbot A. Chubb and Gaines W. Monk, Oak Ridge, Tenn., assignors, by direct and mesne assignments, to the United States of America as represented by the United States Atomic Energy Commission Application October 31, 1946, Serial No. 706,842

5 Claims. (Cl. 250—41.9)

Our invention relates to mass spectrometers, and more particularly to mass spectrometers of the type employed as leak detectors utilizing helium or other appropriate gas for the detection of leaks in tanks, housings, or other equipment where it is necessary to know the effectiveness of the seal or air tightness thereof in connection with maintaining vacuums or pressures therein.

It is the practice in the art to inclose units of equipment in what is known as a dry dock. This dry dock ordinarily takes the form of a housing, casing, or tank with an open side or end. The unit of equipment is ordinarily inserted in the tank, casing, or housing, and the face plate or the part of the unit containing the face plate or other portions of the equipment to be tested ordinarily serve as the closure for the dry dock. The dry dock is equipped with a vacuum system for evacuating it to determine whether the face plate or other portions of the unit leak. The outer surfaces of the dry dock and face plate or other exposed portions of the equipment may be exposed to small amounts of helium gas, or such gas may be present in the atmosphere surrounding the dry dock. A detector is employed to detect the helium that finds its way into the vacuum system by entering the dry dock through the equipment.

In the prior art mass spectrometers have been employed as leak detectors, but designs have been complicated and the expense of construction and operation have been great. The Nier helium detectors are examples of the kind which have been used in the prior art. These detectors employ a magnetic prism to bend, resolve and focus the ion beams, and a suppressor grid outside the magnetic field. The lower ion currents employed make necessary the use of electrometer type amplifiers.

A disadvantage in most leak detectors of this general type using a hot filament has been that a cold trap is necessary since water vapor and other volatiles would otherwise poison the system by causing the hot filament to deteriorate. They also require a well regulated state of filament emission. Other disadvantages are the very low currents obtained with resulting necessity of more precise auxiliary equipment.

Applicants with a knowledge of these problems have for an object of their invention the provision of a leak detector which is much cheaper and simpler to operate than those of the prior art, and which could be built and operated by most physics departments at a reasonable cost, and which would be an aid in vacuum work.

Applicants have as another object of their invention the provision of a leak detector employing an ion source with a cold cathode instead of the usual hot cathode, dispensing with the cold trap, and overcoming the tendency to and effects of poisoning in the system.

Applicants have as another object of their invention the provision of a leak detector where the gas to be ionized is maintained at a higher pressure than that of the beam region to facilitate an increase in the ionization thereof while avoiding the undesirable scattering effects resulting from gas in the beam region.

Applicants have as another object of their invention the provision of a leak detector employing a suppressor to inhibit the passage of slow moving heavy ions through the suppressor that are following the same path as those helium ions that are able to pass through the suppressor, thus preventing these heavy ions from masking the detection of the helium ions by a collector plate located beyond the suppressor. The suppression of the heavier ions being based upon the principle that heavier ions travelling along an arcuate path in a uniform magnetic field will possess less energy than lighter ions travelling along the same arcuate path in the same magnetic field.

Applicants have as another object of their invention the provision of a leak detector using the large ion currents by employing higher current discharge in the source region and a larger angular spread of the beam.

Applicants have as a further object of their invention, the provision of a leak detector of the mass spectrometer type wherein the collector plate is preferably placed well beyond the geometric beam convergency of ions in a uniform magnetic field to obtain an additional factor of separation over normal placement.

Other objects and advantages of our invention will appear from the following specification and the accompanying drawings, and the novel features thereof will be particularly pointed out in the appended claims.

In the drawings, Fig. 1 is a fragmental plan view of our improved leak detector with the cover removed therefrom. Fig. 2 is an elevation, partly in section, of the same leak detector. Fig. 3 is a detail of the ion source. Fig. 4 is a detail of the suppressor. Fig. 5 is a detail of the collector.

Referring to the drawings, showing one form of our leak detector, 1 designates a flat cylindrical vacuum tight casing such as is conventional in mass spectrometers, and is adapted to be supported within a uniform magnetic field. Bolted to this casing by a series of studs 2, 2 is a cover plate. Threaded into the side wall of the casing 1 is a fitting 3 which serves as a gas inlet for the helium detector bringing it into communication with the evacuated system and dry dock heretofore mentioned, but which is not shown in the drawings. This gas inlet directs gas from the system or dry dock, the air tightness of which is to be tested, into the source region identified as chamber 4 and defined by angular baffle plates 5, 6, and 7, where the pressure may be four or five times as great as in other portions of the casing. The casing 1 is also provided with an outlet conduit 37 to which an evacuating device may be connected. The gas outlet is preferably in the trajectory region. The evacuating pump or other means for evacuating the casing creates a high vacuum therein, preferably of less than one-half micron.

Within the chamber 4 is disposed a cold cathode source of ions such as is employed in the Phillips ion gauge and disclosed in the article entitled "High vacuum gauges" appearing in Phillips Technical Review 21; 201–8, 1937, and also in patent to Penning 2,197,079. The ion source consists essentially of an electrode of appropriate configuration disposed between two cathode plates with the magnetic field from the magnet passing between the plates, normal to them and parallel to the axis of the anode. When a voltage of perhaps 1,000 volts is applied to the cathode plates, the resultant oscillations of electrons between the plates produces an ionization current which is proportional to the pressure. The anode comprises a block 8 having a semicircular groove 9 formed in one face thereof. Rearwardly of the groove 9 and extending transversely therethrough is a bore for the reception of a lead 10, which passes in through the wall of casing 1, through the enlargements 11 and is held in sealed proof relation to the casing by nut 12. The lead in question carries appropriate insulation 42. The lead also serves as a support for the anode 8. To the forward edges of the wall forming the groove 9 is joined by soldering or otherwise a plate 39 having a slot 40 which communicates with the groove 9 of the block and which is adapted to be in registration with the slot 20, to be described hereinafter, formed by the baffle plates 5 and 6 to provide a path for the ion source to the beam region. Disposed about the anode on either side thereof and spaced therefrom are a pair of cathode plates 14, joined together adjacent their ends through a block 15. Passing transversely through block 15 is a bore for the reception of a lead 16, preferably held in place by screws 17. The lead also serves as a support for the cathode. The lead 16 passes through an enlargement in casing 1 and is held in air tight or sealed relation to the casing by nut 18. The lead is also properly insulated by insulation 19.

In this arrangement the anode block 8 is positive with respect to ground, while baffles 5, 6, and 7 are at ground potential. This potential difference accelerates the ions into the beam region, pulling the ions out from the region enclosed by plate 39 and anode block 8. It will be further noted that both the cathode and anode elements are insulated from ground to enable any desired accelerating voltage and discharge voltage to be independently maintained. The baffles 5, 6 at their meeting edges form a slot 20, and this slot is in communication with the groove 9 of the block 8 so that the ions leaving the groove 9 through slot 40 of plate 39 may pass directly out into the beam region of casing 1. Since these ions are exposed to a strong magnetic field passing through the casing normal to the plane of Fig. 1, they tend to travel around in circular paths. The leads 10, 16, 26, and 32 all enter the casing through leak assemblies. These assemblies serve to insulate the leads and also serve to maintain the vacuum in the casing. They have been referred to generally herein before. A more detailed description of one of the assemblies may serve to clarify the situation; 13 are end caps between which mica bushings or other forms of insulation 42 are interposed. Extending over these mica bushings and threaded to the enlargement 11 is a nut 12. This assembly is the conventional single lead spark plug arrangement. The radii of these ion paths depend upon the magnetic field, the accelerating voltage of the anode with respect to ground, and the mass and charge of the particlar ion.

The cold cathode ion source just described has the characteristic of producing a wide range of energies. The result is that ions are produced having the same mass but varying radii. The means employed to eliminate low energy ions of heavier masses or prevent them from following the same path as the helium ions is to introduce a positive grid, preferably at or near the focal point, or about 180° from the source or ionizing chamber. This grid, as stated, is positive with respect to the ground and is often made the same potential as the anode. This suppressor grid tends to repel these heavier ions, and its action may be explained as follows:

Different energies represented by different voltages are necessary to accelerate different particles in an arc from a source through the slot in the grid 22. These voltages are related inversely to the masses of the particles by the equations:

$$V_1 = \frac{K}{M_1}$$

or $$V_2 = \frac{K}{M_2}$$

where K is equal to $$\frac{H^2 e r^2}{2C^2}$$

In the above equations:
H is the intensity of the magnetic field,
e is the charge of the ion,
r is the radius of the trajectory of the particle,
c is the velocity of light,
V is the potential the ion has fallen through to be accelerated to its final velocity, and
M is the mass of the particle.

Now, the penetration d of a charged particle with energy equal to eV into an electric field of intensity E is given by:

$$d = \frac{V}{E}$$

so it follows that the penetration is determined by the energy of the particle.

With this in mind, and the further fact that the greater the mass the less the energy for a constant radius of travel, the potential of the suppressor electrode is so selected that it will not exceed the voltage or energy corresponding to that of the lighter particle, but will be greater than the voltage or energy which corresponds to the heavier particle selected for elimination. With this arrangement, the energy in terms of voltage of the lighter particles, i. e., helium will be sufficiently great to permit these particles to pass through the slot in the suppressor electrode 22 against the repelling force of the potential thereon. On the other hand, the energy, in terms of voltage of the heavier undesired particles, will not be sufficiently great to overcome the repelling force of the potential on the suppressor electrode 22, and will not be able to penetrate or pass therethrough, but will be rejected. It is to be understood that the radius of trajectory of the ions in the above equations is a constant. The suppressor grid includes a block 21 from which an extension 22 cooperates to provide a grid electrode. Both the block 21 and extension 22 are shielded by shields 23, 24 inclosing portions of same. Passing through the opening in the side wall of casing 1 and communicating with block 21 and extension 22 is lead 26. This lead passes through bushing support 27, mica bushing 28 and is held in sealed relation to the casing by nut assembly 29. Extending forwardly from the end of grid 22 and inclosing a portion thereof with its bifurcations is angular baffle plate 25. This baffle, in connection with the grid, prevents ions of short radius from getting through to the collector plate described hereinafter.

On beyond the suppressor grid and preferably near the 315 degree position from the ion source is a collector plate for the helium ions. The collector plate is preferably in the form of a block 31 through which passes a lengthwise bore 30 into which is inserted the lead 32. The lead 32 comes into the casing 1 through the side wall and is held to the casing by bushing support 33, bushing 34, and nut 35. Partially inclosing the collector plate 31 is a shield 36. In practice the accelerating voltage between the anode and ground, and the magnetic field are so adjusted as to curve the helium ion beam into a path which will be intercepted by the collector plate.

Having thus described our invention, we claim:

1. A leak detector of the character described for detecting the presence of gas to which equipment has been exposed comprising a housing, a chamber in said housing, means for feeding gases to said chamber, a cathode ion source maintained throughout at substantially the same pressure for ionizing the gases fed into the chamber, electrode means maintained at a predetermined potential for ejecting the ions from the chamber into a region of lower pressure and causing them to travel in arcuate paths as they leave the chamber, a charged suppressor means positioned across said paths for removing the ions of lower energy content, and means positioned beyond the focal point of the ions for collecting ions of the gas to be detected.

2. A leak detector of the character described for detecting the presence of gas to which equipment has been subjected comprising a housing, a chamber in said housing, means for feeding gases to said chamber, a cold cathode ion source for ionizing the gases fed to said chamber, electrode means maintained at a predetermined potential for ejecting the ions from the chamber to a region of lower pressure and for causing them to travel in arcuate paths as they leave the chamber, means maintained at a predetermined potential for suppressing the ions of lower energy content, and means for collecting the ions of the gas to be detached.

3. A leak detector of the character described for detecting the presence of gas to which equipment has been subjected comprising a casing disposed within a magnetic field, baffle plates positioned within the casing to define a pressure chamber, means for feeding gases in equipment to said chamber, means maintained at substantially the same pressure throughout for ionizing the gases fed to the chamber, electrode means maintained at a predetermined potential for removing ions from said chamber to a region of lower pressure and causing them to travel in circular paths, means displaced angularly from the source along the arc of travel of the ions for collecting them, and means at a predetermined potential positioned within the field for suppressing ions of low energy content before they reach the collecting means.

4. A leak detector of the character described for detecting the presence of gas to which equipment has been exposed comprising a casing, baffle plates disposed within the casing to define a pressure chamber, means for feeding gases to be tested into the chamber, a cold cathode ion source for ionizing said gases, charged electrode means for removing ions from said chamber to a region of lower pressure and for accelerating the ions in arcuate paths as they leave the chamber, means displaced from the chamber along the arc of travel of said ions to a point beyond the focal point of said ions for collecting them and charged electrode means for suppressing ions of low energy content before they reach said collecting means.

5. A leak detector of the character described for detecting the presence of gas to which equipment has been exposed comprising a casing, a pressure chamber in the casing, means for feeding gases to be tested to said chamber, means for ionizing said gases, electrode means maintained at a predetermined potential for removing the ions from the chamber to a region of lower pressure and for accelerating them in arcuate paths as they leave the chamber to provide an ion beam, charged electrode means displaced from the chamber along the arc of travel of the ions and at substantially the focal point of said beam for suppressing the ions of low energy content, and collector means beyond the focal point on the arc of travel of the ions and next adjacent to the ion source for collecting ions of the gas to be detected.

References Cited in the file of this patent

UNITED STATES PATENTS

| | | |
|---|---|---|
| 2,197,079 | Penning | Apr. 16, 1940 |
| 2,370,673 | Langmuir | Mar. 6, 1945 |
| 2,373,151 | Taylor | Apr. 10, 1945 |
| 2,387,786 | Washburn | Oct. 30, 1945 |
| 2,450,462 | Washburn | Oct. 5, 1948 |
| 2,457,530 | Coggeshall et al. | Dec. 28, 1948 |
| 2,471,935 | Coggeshall et al. | May 31, 1949 |
| 2,486,199 | Nier | Oct. 25, 1949 |
| 2,499,288 | Backus | Feb. 28, 1950 |

OTHER REFERENCES

Bleakney: American Physics Teacher, vol. 4, pages 12–23, 250–41.9 (February 1936).

Bainbridge and Jordan: Physical Review, vol. 50, pages 282–292 (Aug. 15, 1936).